United States Patent
Wei et al.

(10) Patent No.: US 10,652,954 B2
(45) Date of Patent: May 12, 2020

(54) TELECOMMUNICATIONS APPARATUSES AND METHODS

(71) Applicant: Sony Corporation, Tokyo (JP)

(72) Inventors: Yuxin Wei, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/752,914

(22) PCT Filed: Sep. 29, 2016

(86) PCT No.: PCT/EP2016/073313
§ 371 (c)(1),
(2) Date: Feb. 15, 2018

(87) PCT Pub. No.: WO2017/055482
PCT Pub. Date: Apr. 6, 2017

(65) Prior Publication Data
US 2018/0242393 A1  Aug. 23, 2018

(30) Foreign Application Priority Data
Oct. 2, 2015 (EP) .................................. 15188113

(51) Int. Cl.
*H04W 88/04* (2009.01)
*H04W 76/14* (2018.01)
(Continued)

(52) U.S. Cl.
CPC ........... *H04W 88/04* (2013.01); *H04W 28/26* (2013.01); *H04W 72/04* (2013.01); *H04W 76/14* (2018.02);
(Continued)

(58) Field of Classification Search
CPC ..... H04W 88/04; H04W 76/14; H04W 76/34; H04W 72/0406; H04W 28/26
See application file for complete search history.

(56) References Cited

U.S. PATENT DOCUMENTS 8,301,781 B1 * 10/2012 Ludwig ................... H04L 67/02
709/206
9,155,002 B2 * 10/2015 Jang ................... H04W 36/0016
(Continued)

FOREIGN PATENT DOCUMENTS

WO    2015/143170 A1    9/2015
WO    2017/055157 A1    4/2017

OTHER PUBLICATIONS

International Search Report dated Dec. 21, 2016, in PCT/EP2016/073313, filed Sep. 29, 2016.
(Continued)

*Primary Examiner* — Rasheed Gidado
(74) *Attorney, Agent, or Firm* — Xsensus LLP

(57) ABSTRACT

A method of allocating resources in a mobile telecommunications system, the resources being for a relay node to operate as a terminal-to-terminal relay for a device-to-device communication between a first terminal and a second terminal. The method includes: allocating first resources for the first terminal to communicate via the relay node for the device-to-device communication; allocating second resources for the second terminal to communicate via the relay node for the device-to-device communication; notifying the first terminal of the allocated first resources; notifying the second terminal of the allocated second resources; and the first and second terminals exchanging messages for the device-to-device communication via the relay node and using the first and second resources, respectively.

20 Claims, 8 Drawing Sheets

(51) Int. Cl.
*H04W 76/34* (2018.01)
*H04W 28/26* (2009.01)
*H04W 72/04* (2009.01)
*H04W 92/18* (2009.01)

(52) U.S. Cl.
CPC ........ *H04W 76/34* (2018.02); *H04W 72/0406* (2013.01); *H04W 92/18* (2013.01)

(56) References Cited

U.S. PATENT DOCUMENTS

| | | | | |
|---|---|---|---|---|
| 9,392,615 | B2* | 7/2016 | Narasimha | H04W 76/14 |
| 10,064,212 | B2* | 8/2018 | Faurie | H04W 28/0278 |
| 2014/0185587 | A1* | 7/2014 | Jang | H04W 36/0005 |
| | | | | 370/331 |
| 2015/0016410 | A1* | 1/2015 | Lee | H01L 1/18 |
| | | | | 370/330 |
| 2015/0119056 | A1* | 4/2015 | Lee | H04W 72/042 |
| | | | | 455/450 |
| 2015/0264588 | A1* | 9/2015 | Li | H04W 56/0015 |
| | | | | 370/350 |
| 2015/0271856 | A1* | 9/2015 | Tong | H04W 16/26 |
| | | | | 455/426.1 |
| 2015/0327265 | A1* | 11/2015 | Lee | H04W 72/0446 |
| | | | | 370/311 |
| 2016/0295565 | A1* | 10/2016 | Kim | H04W 76/14 |
| 2016/0338119 | A1* | 11/2016 | Bodas | H04W 76/14 |
| 2018/0054253 | A1* | 2/2018 | Seo | H04B 17/318 |
| 2018/0199312 | A1* | 7/2018 | Wu | H04W 72/02 |

OTHER PUBLICATIONS

Holma H. and Toskala A., "LTE for UMTS OFDMA and SC-FDMA Based Radio Access", John Wiley and Sons, 2009, 4 pages.

"3rd Generation Partnership Project; Technical Specification Group Services and System Aspects, Study on application architecture to support Mission Critical Push to Talk over LTE (MCPTT) services (Release 13)", 3GPP TR 23. 779 V0.7.1, May 2015,152 pages, XP051038291.

Sony, "Resource Allocation for Remote UE", R2-153129, 3GPP TSG RAN WG2 Meeting #91, Aug. 24-28, 2015, 3 pages, XP 050991613.

* cited by examiner

TELECOMMUNICATIONS APPARATUSES AND METHODS

CROSS-REFERENCE TO RELATED APPLICATIONS

The present application is based on PCT filing PCT/EP2016/073313 filed Sep. 29, 2016, and claims priority to European Patent Application 15 188 113.3, filed in the European Patent Office on Oct. 2, 2015, the entire contents of each of which being incorporated herein by reference.

FIELD

The present disclosure relates to telecommunications apparatuses and methods.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) and Long Term Evolution Advanced (LTE-A) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which there is a desire for a group of terminal devices (communications devices) to exchange information with each other in a fast and reliable manner. In order to help address these limitations there have been proposed approaches in which terminal devices within a wireless telecommunications system may be configured to communicate data directly with one another without some or all their communications passing through an infrastructure equipment element, such as a base station. Such communications are commonly referred to generally as a device-to-device (D2D) communications. Many device-to-device communications may be transmitted by one device to a plurality of other devices in a broadcast like manner and so in that sense the phrase "device-to-device communications" also covers "device-to-devices communications".

Thus, D2D communications allow communications devices that are in sufficiently close proximity to directly communicate with each other, both when within the coverage area of a network and when outside a network's coverage area (e.g. due to geographic restrictions on a network's extent or because the network has failed or is in effect unavailable to a terminal device because the network is overloaded). D2D communications can allow user data to be more efficiently and quickly communicated between communications devices by obviating the need for user data to be relayed by a network entity such as a base station. D2D communications also allow communications devices to communicate with one another even when one or both devices may not be within the reliable coverage area of a network. The ability for communications devices to operate both inside and outside of coverage areas makes wireless telecommunications systems that incorporate D2D capabilities well suited to applications such as public protection/safety and disaster relief (PPDR), for example. PPDR related communications may benefit from a high degree of robustness whereby devices can continue to communicate with one another in congested networks and when outside a coverage area. 3GPP has developed some proposals for such public safety D2D use in LTE networks in Release12.

In parallel, the development of relay nodes in telecommunications system is expected to facilitate communications with the base stations and potentially to expand the range of coverage of the base stations by relaying communications between terminal devices and base stations. However, due to the complexity of D2D arrangements and in particular to the lack of centralised control points (like the base stations in a conventional mobile network), there is at present a lack of relaying solutions for D2D communications.

SUMMARY

According to a first example aspect, there is provided a method of allocating resources in a mobile telecommunications system, the resources being for a relay node to operate as a terminal-to-terminal relay for a device-to-device communication between a first terminal and a second terminal, the method comprising: allocating first resources for the first terminal to communicate via the relay node for the device-to-device communication; allocating second resources for the second terminal to communicate via the relay node for the device-to-device communication; notifying the first terminal of the allocated first resources; notifying the second terminal of the allocated second resources; and the first and second terminals exchanging messages for the device-to-device communication via the relay node and using the first and second resources, respectively.

According to a second example aspect, there is provided a method of operating a terminal in a mobile telecommunications system and for using a relay node as a terminal-to-terminal relay for a device-to-device communication between the terminal and a further terminal, the method comprising the terminal: receiving one or more grant messages notifying the terminal of allocated resources for the relay node to relay the device-to-device communication; and the terminal exchanging messages with the further terminal for the device-to-device communication, via the relay node and using the allocated resources.

According to a third example aspect, there is provided a terminal for use in a mobile telecommunications system and for using a relay node as a terminal-to-terminal relay for a device-to-device communication between the terminal and a further terminal, the terminal comprising a transceiver and a controller, wherein the controller is configured to: receive, via the transceiver, one or more grant messages notifying the terminal of allocated resources for the relay node to relay the device-to-device communication; and exchange, via the transceiver, messages with the further terminal for the device-to-device communication, via the relay node and using the allocated resources.

According to a fourth example aspect, there is provided circuitry for a terminal for use in a mobile telecommunications system and for using a relay node as a terminal-to-terminal relay for a device-to-device communication between the terminal and a further terminal, wherein the circuitry comprises a controller element and a transceiver element configured to operate together to: receive one or more grant messages notifying the terminal of allocated resources for the relay node to relay the device-to-device communication; and exchange messages with the further terminal for the device-to-device communication, via the relay node and using the allocated resources.

According to a fifth example aspect, there is provided a method of allocating resources in a mobile telecommunications system, the resources being for a relay node to operate as a terminal-to-terminal relay for a device-to-device communication between a first terminal and a second terminal, the method comprising: the relay node identifying a resource pool for terminal-to-terminal relaying; the relay node allocating first resources from the resource pool for the first terminal to communicate via the relay node for the device-to-device communication; the relay node allocating second resources from the resource pool for the second terminal to communicate via the relay node for the device-to-device communication; the relay node transmitting one or more grant messages notifying the first and second terminals of the allocated first and second resources; and the first and second terminals exchanging messages for the device-to-device communication via the relay node and using the first and second resources, respectively.

According to a sixth example aspect, there is provided a method of operating a relay node for allocating resources in a mobile telecommunications system, the resources being for a relay node to operate as a terminal-to-terminal relay for a device-to-device communication between a first terminal and a second terminal, the method comprising the relay node: identifying a resource pool for terminal-to-terminal relaying; allocating first resources from the resource pool for the first terminal to communicate via the relay node for the device-to-device communication; allocating second resources from the resource pool for the second terminal to communicate via the relay node for the device-to-device communication; and transmitting one or more grant messages notifying the first and second terminals of the allocated first and second resources.

According to a seventh example aspect, there is provided a relay node for allocating resources in a mobile telecommunications system, the resources being for a relay node to operate as a terminal-to-terminal relay for a device-to-device communication between a first terminal and a second terminal, the relay node comprising a transceiver and a controller, the controller being configured to: identify a resource pool for terminal-to-terminal relaying; allocate first resources from the resource pool for the first terminal to communicate via the relay node for the device-to-device communication; allocate second resources from the resource pool for the second terminal to communicate via the relay node for the device-to-device communication; and transmit, via the transceiver, one or more grant messages notifying the first and second terminals of the allocated first and second resources.

According to a eighth example aspect, there is provided circuitry for a relay node for allocating resources in a mobile telecommunications system, the resources being for a relay node to operate as a terminal-to-terminal relay for a device-to-device communication between a first terminal and a second terminal, wherein the circuitry comprises a controller element and a transceiver element configured to operate together to: identify a resource pool for terminal-to-terminal relaying; allocate first resources from the resource pool for the first terminal to communicate via the relay node for the device-to-device communication; allocate second resources from the resource pool for the second terminal to communicate via the relay node for the device-to-device communication; and transmit one or more grant messages notifying the first and second terminals of the allocated first and second resources.

According to a ninth example aspect, there is provided a method of operating a base station in a mobile telecommunications system and for using a relay node as a terminal-to-terminal relay for a device-to-device communication between a first terminal and a second terminal, the method comprising the base station: receiving, from the relay node, a resource pool allocation request;

identifying a resource pool for the relay node to allocate resources for terminal-to-terminal relaying; notifying the relay node that the identified resource pool has been allocated to the relay node to allocate resources for terminal-to-terminal relaying. According to a tenth example aspect, there is provided a base station for use in a mobile telecommunications system and for using a relay node as a terminal-to-terminal relay for a device-to-device communication between a first terminal and a second terminal, the base station comprising a transceiver and a controller, the controller being configured to: receive, from the relay node and via the transceiver, a resource pool allocation request; identify a resource pool for the relay node to allocate resources for terminal-to-terminal relaying; notify, via the transceiver, the relay node that the identified resource pool has been allocated to the relay node to allocate resources for terminal-to-terminal relaying.

According to a eleventh example aspect, there is provided circuitry for a base station for use in a mobile telecommunications system and for using a relay node as a terminal-to-terminal relay for a device-to-device communication between a first terminal and a second terminal, wherein the circuitry comprises a controller element and a transceiver element configured to operate together to: receive, from the relay node, a resource pool allocation request; identify a resource pool for the relay node to allocate resources for terminal-to-terminal relaying; notify the relay node that the identified resource pool has been allocated to the relay node to allocate resources for terminal-to-terminal relaying.

According to a twelfth example aspect, there is provided a method of allocating resources in a mobile telecommunications system, the resources being for a relay node to operate as a terminal-to-terminal relay for a device-to-device communication between a first terminal and a second terminal, the method comprising: the relay node requesting, to a base station, resources for relaying the device-to-device communication; the base station allocating first resources for the first terminal to communicate via the relay node for the device-to-device communication; the base station allocating second resources for the second terminal to communicate via the relay node for the device-to-device communication; the base station notifying the relay node of the allocated first and second resources; notifying the first terminal of the allocated first resources; notifying the second terminal of the allocated second resources; and the first and second terminals exchanging messages for the device-to-device communication via the relay node and using the allocated first and second resources, respectively.

According to a thirteenth example aspect, there is provided a method of operating a relay node for allocating resources in a mobile telecommunications system, the resources being for a relay node to operate as a terminal-to-terminal relay for a device-to-device communication between a first terminal and a second terminal, the method comprising the relay node: requesting, to a base station, resources for relaying the device-to-device communication; and receiving, from the base station, a notification of allocated first resources and allocated second resources, the allocated first resources being allocated for the first terminal to communicate via the relay node for the device-to-device communication and the allocated second resources being allocated for the second terminal to communicate via the relay node for the device-to-device communication.

According to a fourteenth example aspect, there is provided a relay node for allocating resources in a mobile telecommunications system, the resources being for a relay node to operate as a terminal-to-terminal relay for a device-to-device communication between a first terminal and a second terminal, the relay node comprising a transceiver and a controller, the controller being configured to: request, to a base station and via the transceiver, resources for relaying the device-to-device communication; and receive, via the transceiver and from the base station, a notification of allocated first resources and allocated second resources, the allocated first resources being allocated for the first terminal to communicate via the relay node for the device-to-device communication and the allocated second resources being allocated for the second terminal to communicate via the relay node for the device-to-device communication.

According to a fifteenth example aspect, there is provided circuitry for a relay node for allocating resources in a mobile telecommunications system, the resources being for a relay node to operate as a terminal-to-terminal relay for a device-to-device communication between a first terminal and a second terminal, wherein the circuitry comprises a controller element and a transceiver element configured to operate together to: request, to a base station, resources for relaying the device-to-device communication; and receive, from the base station, a notification of allocated first resources and allocated second resources, the allocated first resources being allocated for the first terminal to communicate via the relay node for the device-to-device communication and the allocated second resources being allocated for the second terminal to communicate via the relay node for the device-to-device communication.

According to a sixteenth example aspect, there is provided a method of operating a base station in a mobile telecommunications system and for using a relay node as a terminal-to-terminal relay for a device-to-device communication between a first terminal and a second terminal, the method comprising the base station: receiving, from a relay node, a request for resources for relaying the device-to-device communication; allocating first resources for the first terminal to communicate via the relay node for the device-to-device communication; allocating second resources for the second terminal to communicate via the relay node for the device-to-device communication; and notifying the relay node of the allocated first and second resources.

According to a seventeenth example aspect, there is provided a base station for use in a mobile telecommunications system and for using a relay node as a terminal-to-terminal relay for a device-to-device communication between a first terminal and a second terminal, the base station comprising a transceiver and a controller, the controller being configured to: receive, from a relay node and via the transceiver, a request for resources for relaying the device-to-device communication; allocate first resources for the first terminal to communicate via the relay node for the device-to-device communication; allocate second resources for the second terminal to communicate via the relay node for the device-to-device communication; and notify, via the transceiver, the relay node of the allocated first and second resources.

According to a eighteenth example aspect, there is provided circuitry for a base station for use in a mobile telecommunications system and for using a relay node as a terminal-to-terminal relay for a device-to-device communication between a first terminal and a second terminal, wherein the circuitry comprises a controller element and a transceiver element configured to operate together to: receive, from a relay node requesting a request for resources for relaying the device-to-device communication; allocate first resources for the first terminal to communicate via the relay node for the device-to-device communication; allocate second resources for the second terminal to communicate via the relay node for the device-to-device communication; and notify the relay node of the allocated first and second resources.

According to a nineteenth example aspect, there is provided computer software which, when executed by a computer, causes the computer to perform any of the methods discussed above and according to a twentieth example aspect, a storage medium which stores the computer software.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
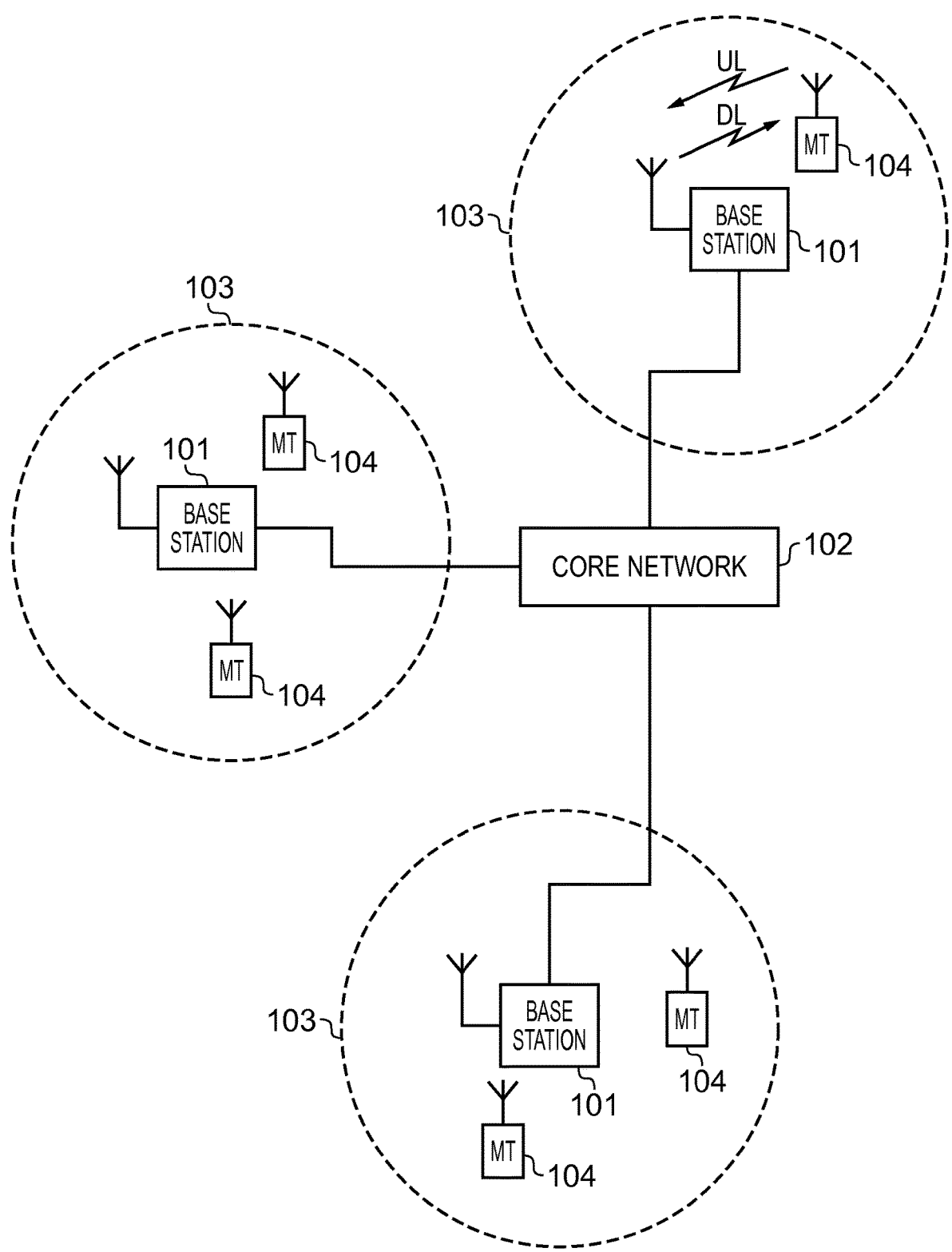
FIG. 1 provides a schematic diagram illustrating an example of a mobile telecommunication system.

FIG. 1 provides a schematic diagram illustrating some basic functionality of a mobile (cellular) telecommunications network/system, in this example operating generally in accordance with LTE principles, and which may be adapted to implement embodiments of the disclosure as described further below. Various elements of FIG. 1 and their respective modes of operation are well-known and defined in the relevant standards administered by the 3GPP® body, and also described in many books on the subject, for example, Holma, H. and Toskala, A. [1]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that may be used by the operator of the network 100. The core network 102 routes data to and from the terminal devices 104 via the respective base stations 101 and provides functions such as authentication, mobility management, charging and so on. In addition to the base stations 101 and terminal devices 104, the system may further comprise one or more relay nodes/devices 105. These may be used to enhance coverage for terminal devices operating in the relevant cell(s). The deployment of relay nodes (e.g. in terms of their locations) may follow generally established techniques for using relay nodes to support coverage in wireless telecommunications systems by assisting downlink and/or uplink communications. In terms of terminology, it will be appreciated that terminal devices may also be referred to as mobile stations, user equipment (UE), user terminal, mobile radio, mobile terminal, mobile device and so forth. Similarly, base stations may also be referred to as transceiver stations/nodeBs/e-nodeBs, and so forth. Furthermore, relay nodes may also be referred to as relay devices/relays, and so forth. In some example implementations of the present disclosure, a terminal device may be operating as a relay node to assist in supporting communications associated with other terminal devices. That is to say, the functionality of a relay device may be provided by a suitably configured terminal device.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
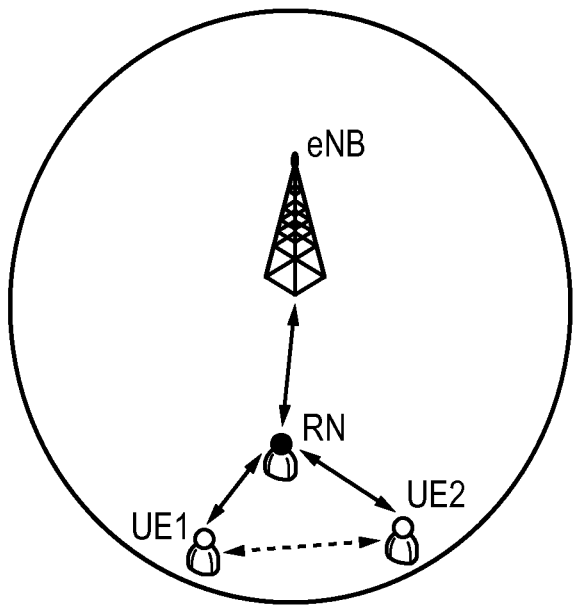
FIGS. 2-5 schematically represent examples of terminal-to-terminal relay assistance.

FIGS. 2-5 schematically represent examples of terminal-to-terminal relay assistance. In the example of FIG. 2, the mobile node operating as a relay (that will sometimes be referred to as Relay Node or "RN") and the two terminals UE1 and UE2 are all within coverage of the base station (eNB), with the terminals being located at the edge of the cell. In a conventional arrangement, if UE1 and UE2 are under coverage of a base station and wish to set up a D2D communication, they have to request resources from the base station and wait for the base station's allocation before they can fully establish the D2D communication. If one of UE1 or UE2 receives a grant, sometimes referred to as an uplink grant, from the base station that indicates the resources allocation, conventionally it will announce the allocated resources in a broadcast scheduling assignment. Once the other one of UE1 and UE2 gets this resource allocation information, they can both start the D2D communication on these specific resources. In cases where the link between UE1 and/or UE2 and the base station is of poor quality (e.g. with a weak power and/or interferences from other signals), the uplink grant (for both the sending of the scheduling assignment and for the D2D communication data) may not always be received from the base station and any future control signalling from the base station may also suffer from the same problem. In a case where another terminal, or any other type of mobile mode or device, is located between the base station and the cell edge terminals, this terminal could operate as a RN, as illustrated in FIG. 2, for assisting one of or both of the establishment of the D2D link and any subsequent D2D data communication. For example, if the RN mobile node is to operate as a terminal-to-terminal relay node, the base station may sent a grant for resources for UE1-RN communications and another one for UE2-RN operations and then the RN can assist with the setting up and with the carrying out of the terminal-to-terminal communications between UE1 and UE2. Also, by using a relay between UE1 and UE2, whether at the edge of the cell or not, the transmission power used by these UEs can be reduced thereby assisting with reducing power consumption and interferences.

Figure 3:
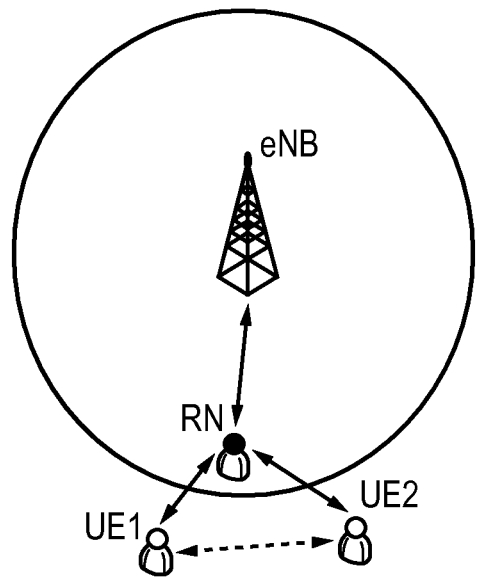
Figure 4:
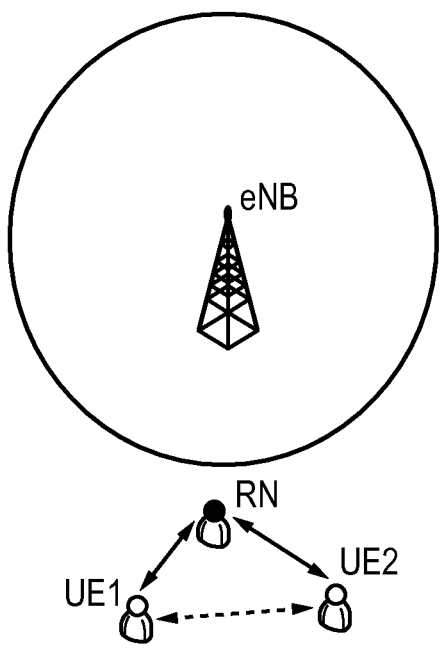
Figure 5:
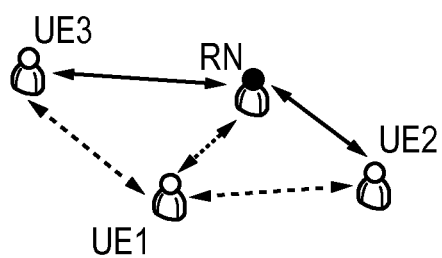

In another example, illustrated in FIGS. 3 and 4, the terminals UE1 and UE2 are out of coverage of the base station. In the example of FIG. 3, UE1 and UE2 are located outside the cell for the base station with the RN being located within the cell while UE1 and UE2 are located inside the cell for the base station with the RN being located outside the range of the base station (such that the presence or absence of a base station has no relevance). In a conventional D2D system, if UE1 and UE2 decide to establish a D2D communication, one of the two terminals can select resources from a resource pool to transmit messages comprising control and/or data information. The resource pool can be pre-configured, and/or semi-statically allocated. While some resource collision with other D2D communications in the proximity of the two terminals may occur with this type of an autonomous selection scheme, this is outside the scope of the present disclosure. If another terminal (or another mobile node) is located within range of both these terminals, the assistance of such a mobile node as a terminal-to-terminal relay node could help the D2D communications between the two terminals. Also, in some examples, such a RN could also act as a central controller for the allocation of D2D resource from a D2D resource pool. As a result, the quality of D2D communication link between UE1 and UE2 can be improved using the relay node, and potentially the quality of other D2D communications in the area can also be improved if the level of resources collision and/or interferences can be reduced.

In yet another example illustrated in FIG. 4, the terminals UE1-UE3 and the mobile node RN are located in the same area. None, some or all of these four mobile nodes may be within the range of a base station (whether on the edge of the cell or not) or may be out of coverage. UE2 and UE3, which are relatively distant from each other may have some difficulty establishing or maintaining a D2D link. One of the possible options for improving the situation is to increase the transmission power of the terminals so that their respective transmissions can reach the other terminal more easily. However, this option will increase the power consumption of the UE and may also cause (or increase the effect of) interferences to other communications in the area. On the other hand, if at least one mobile node is situated in-between UE2 and UE3 (e.g. RN and UE1 in FIG. 5) and could assist these terminals with their D2D communication, the effect of some of the above disadvantages can be reduced. For example, if at least one terminal (e.g. RN, UE1) situated in between the two D2D terminals (e.g. UE2, UE3) could work as a relay for these two D2D terminals or assign another terminal (e.g. UE1, RN) as the terminal-to-terminal relay for these two D2D UEs, the D2D communications could be improved. In one example, and referring back to FIG. 5, RN may be operating as a relay for D2D communications between UE2 and UE3, either by default or by selection, and this mobile node may also be configured to assign the relay function to UE1 so that UE1 becomes the terminal-to-terminal relay for D2D communications between UE1 and UE2. Additionally, such a terminal may also assist in managing the resource allocation for one or more D2D terminals in the area. Accordingly, using such a terminal-to-terminal relay may help in improving the overall network performance while limiting the negative effect on the energy efficiency and spectrum efficiency of the network.

While terminal-to-terminal relaying can bring some benefits to a mobile telecommunications system, it is presently unclear how the allocations of resources for terminal-to-terminal or device-to-device relaying can be carried out.

According to the present disclosure, there are provided methods and examples of allocating resources for a relay node to operate as a terminal-to-terminal relay for a device-to-device communication between a first terminal and a second terminal.

In one example, hereinafter referred to as the first example, the terminal-to-terminal or D2D relaying resources are allocated under a network control mode. In a case where at least the relay node is under coverage of a base station, but also in cases where the D2D UEs are within the range of the base station as well, the D2D UEs will be allocated resources by the base station for communicating via the relay node or relay UE for their D2D communication. For example, the D2D UEs can ask for resources to be allocated for discovery, data communication and/or control-related information (e.g. for D2D UEs themselves as well as for relay UE) to network, through the relay UE sidelink or to the base station, each time the D2D UEs have identified the relay UE as the D2D relay for their D2D communication(s). For the relay to be selected as a D2D relay, it is generally expected to have a relatively good link quality with the network as well as the relevant D2D UEs, although the detailed identification and selection of a D2D relay node is not the subject of the present disclosure. The skilled person is directed to the EP application number 15188002.8 filed by the Applicant on 1 Oct. 2015, which is incorporated by reference herein in its entirety, for a discussion of possible methods and arrangements for selecting a relay node in a mobile telecommunications network. Once the relay UE receives the corresponding control signalling from network notifying it of the resources allocated for relaying the D2D communication and once the D2D have also been informed of at least the allocated resources that are relevant to them (e.g. from the network or via the relay UE forwarding this information to them on a sidelink control channel), the D2D relaying may start. For example, the relay UE can then monitor the allocated resources for discovery, control and communication messages from the neighbouring D2D UEs on corresponding channels, and forward discovery and communication messages to the desired destination in accordance with a D2D or terminal-to-terminal relaying arrangement.

Figure 6:
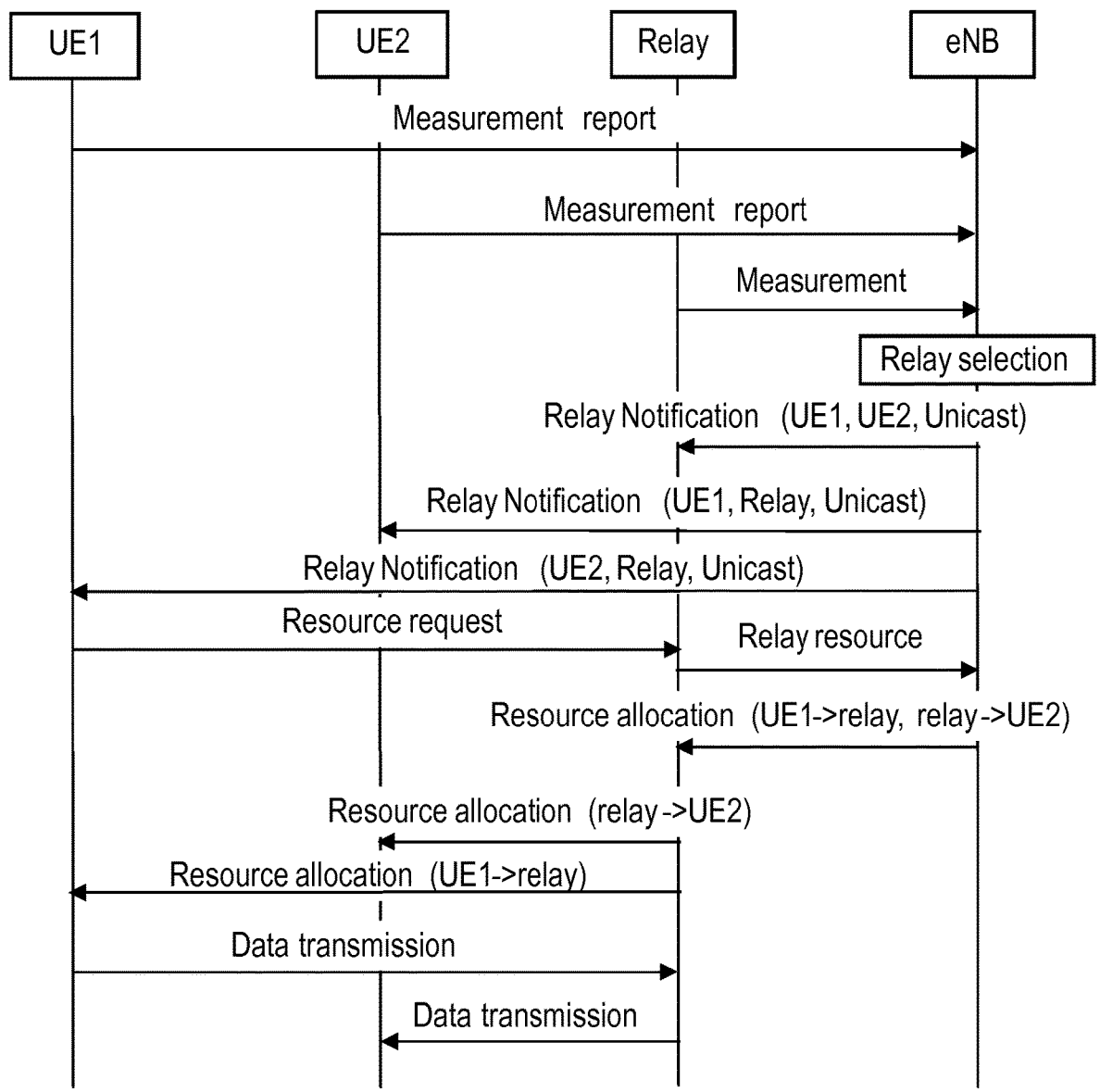
FIG. 6 illustrates an example of a call flow for a D2D relaying resources allocation.

FIG. 6 illustrates an example of a call flow for a D2D relaying resources allocation. In this example a relay node is selected to act as a relay for a D2D unicast communication from UE1 to UE2, based on measurements from UE1, UE2 and the relay UE. In a case where the UE1-UE2 link is having a poor or low quality for example, the relay may then be identified as a possible help for the D2D communication. The network can for example configure UE1, UE2 and optionally neighbouring UEs (as possible relay candidates) to carry out and report on measurements. Measurement reports can then be sent, for example once a measurement event has been triggered by the measured link quality. In some cases, the neighbouring UEs may not necessarily be in a connected (e.g. RRC_CONNECTED) state, but for them to send the measurement report, they may have to transition to a connected state, for example with the network sending a RRC connection establishment signalling. They may then be able to send the measurement report, if appropriate, and may then return to a non-connected (e.g. RRC_IDLE) state. Based on the received measurement reports, the network may then select a relay for them. As the relay will assist with a unicast D2D communication from UE1 to UE2, in this example, the relay can be identified as such in the relay notification. It is noteworthy that the method(s) for selecting a relay and for notifying the relevant nodes of the selected relay may vary.

Once the UE1 has been notified of the selected relay (or has identified the relay if it is identifying the relay itself), it can send a resource request to the relay to request a resource allocation for data transmission. The relay can then transmit the allocation request to network (e.g. to the base station) for the resource allocation of the appropriate UE-Relay links. As in this example the relaying is for a unicast and unidirectional communication from UE1 from UE2, the base station can allocate resources from UE1 to the relay and from the relay to UE2. The base station can then notify the relay and, once the relay has received the resource allocation from the base station, the relay can notify the relevant terminals, i.e. UE1 and UE2 in this example, e.g. through a sidelink control channel. It is noteworthy that in a case where the terminals are also within range of the base station, they can be notified of the allocated resources by the base station directly rather than from the relay node.

Now that the resources have been allocated and notified o all relevant parties, UE1 can start the unicast transmission to UE2, through relay UE using the resources allocated to that end (UE1→relay resources). The relay node can then forward the messages to UE2 using the resources allocated to that end (relay→UE2 resources). Although different relaying scheme may be applied, it is expected that during data transmission, the UE1 will set its ID as the source and UE2 ID as the destination and that, once the relay node receives the messages with the UE1 as the source and UE2 as the destination, rather discarding them (as they are not destined to the relay) it may first check or determined whether the message is to be relayed. As the relay is aware that it is operating as a D2D relay from UE1 to UE2, based on the source and destination IDs it can identify that the messages related to a relayed communication and it can then forward the message to UE2 (in some example, with the modification of the source to its own ID, if appropriate based on the relaying scheme implemented). In a case where the relay is responsible for notifying, via the sidelink, the terminals of the allocated resources may use or reuse a sidelink control channel, such as a PC5 control channel as presently used in a D2D environment, for example using a scheduling assignment scheme that is already in place, thereby minimising the amount of changes to be made to the existing arrangements, if such changes are considered as preferably limited.

It is noteworthy that although this example uses the example of a unidirectional communication (UE1 to UE2), in some cases resources may still be allocated in the UE2 to UE1 direction (e.g. if ACK and/or NACK messages are expected from UE2 to UE1) and the same principles apply to a bidirectional communication between UE1 and UE2. Generally any possible form of UE1 communicating with UE2 is being considered under the present disclosure, e.g. for this example and the other examples, e.g. unicast, groupcast and broadcast communications, unidirectional or bidirectional communications, etc.

Returning to this first example, the network is in charge of allocation resources, for example via the base station, and the relay and the D2D UEs can then comply to the relaying arrangement selected (and notified) using the allocated resources. Such a centralised arrangement can facilitate an optimised use of resources, with for example the base station being capable of allocating resources for D2D relaying in one area while allocating resources for D2D relaying in a neighbouring area which are less likely to cause interferences and/or allocating at least some of these resources for D2D relaying, or for another use, at another end of the cell e.g. when it is expected that the allocating of these overlapping resources will not cause a conflict or interferences. Accordingly the use of the resources within the cell can be potentially improved by using the network or base station as the entity allocating the resources for the D2D relaying.

In another example, hereinafter referred to as the second example, the terminal-to-terminal or D2D relaying resources are allocated under a hybrid control mode wherein a first set of resources, or resource pool, is allocated by the network to a relay node and the relay can then decide how to allocate the resources in the resource pool, for communications with terminals to carry out D2D relaying. In this other example, such a partial network control mode is being implemented. A resource pool is configured by the network for UE-to-UE relay via the relay node where the resource pool could be semi-configured or dynamically configured by the network. For example, a semi-configured resource pool can be signalled by higher layer to the relay and/or the corresponding D2D UEs, such as by indicating an identifier for a pool identifying the pool amongst the variety of pools that are pre-configured. In one example using a dynamic resource pool, the relay UE can ask the resource allocation for its local D2D sub-network to the network each time a resource pool is needed (e.g. if no resource pool was previously configured and the relay will now operate as a relay or if a resource pool was previously configured but the relay requires additional resources to perform the relaying). Once the resource pool has been allocated to the relay, this relay can decide by itself how to allocate the resources of the resource pool to the D2D UEs it is interacting with and can send them the corresponding control information, e.g. on a sidelink. The relay UE can then monitor the allocated resources for communications from the neighbouring UEs, including for example their discovery, control and communication messages on corresponding channels, and forward the communications (e.g. discovery and communication messages) to the desired destination. Accordingly a local D2D link through the relay can be established. In this second example, the relay can operate as the central node for resource allocation, in a similar fashion to how a base station/an eNodeB operates, and send control signalling as well, while it still remain under some network supervision.

Figure 7:
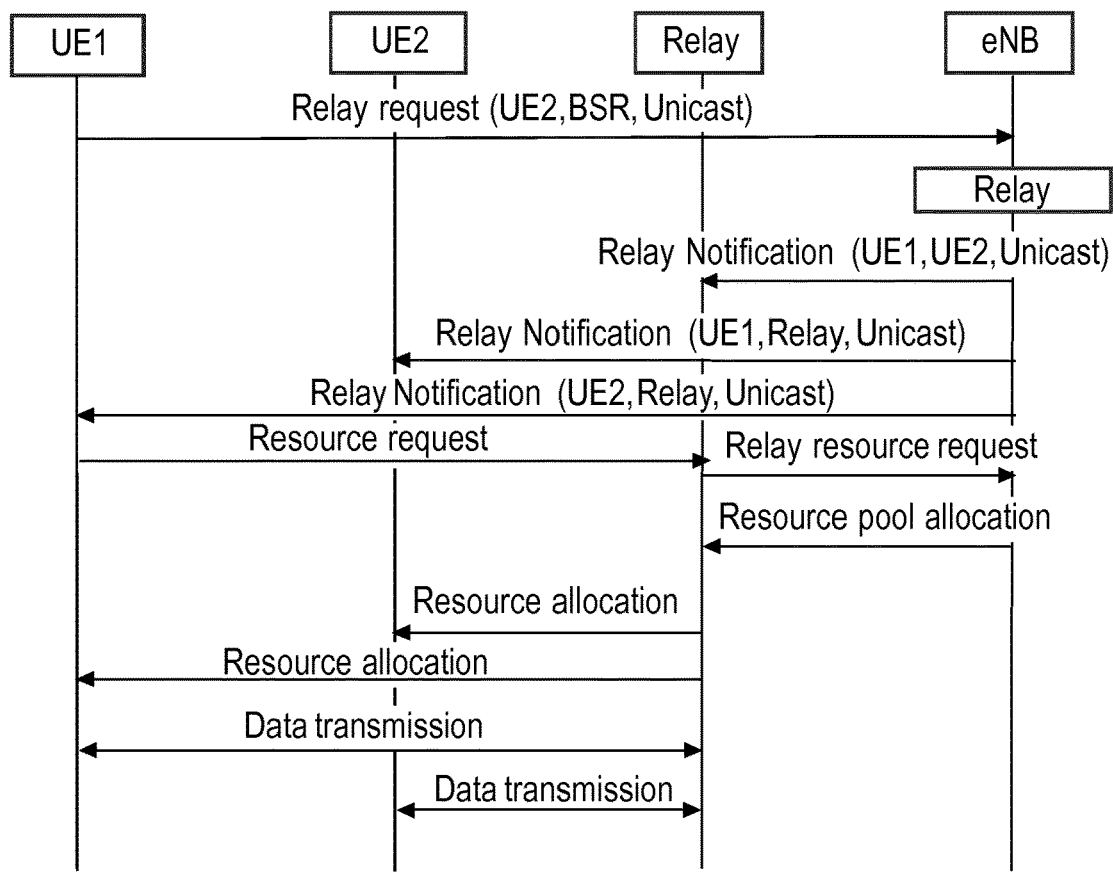
FIG. 7 illustrates another example of a call flow for a D2D relaying resources allocation.

FIG. 7 illustrates another example of a call flow for a D2D relaying resources allocation. In this example, it is assumed that UE1 has an existing D2D unicast communication with UE2 but their link is currently poor quality. Accordingly, UE1 may send a relay request to network and the network can select a relay for their communication. In some cases, for the terminal to send the relay request, terminal (UE1 in this example) may not have to be in a connected (e.g. RRC_CONNECTED) state. And in some cases, for the terminal to receive the relay notification from the network by dedicated signalling, it may have to be in a connected state and, in this case, it may have to be transitioned into a connected (e.g. RRC_CONNECTED) state. An example procedure of the UE-to-UE unicast relay establishment is depicted in FIG. 7 although, as the skilled person will understand, any other suitable arrangement or method for identifying/selecting the relay and notifying the relay selection may be implemented. As previously mentioned, in this second example, a semi-persistent resource pool or dynamic resource pool may be allocated to the relay for this relay node to schedule the resources for its UEs. In the example illustrated in FIG. 7, a dynamic resource pool case is being shown but the same teachings and principles can be applied equally to a semi-persistent resource pool case. In this example, once UE1 receives a Relay Notification message indicating the identifier of the selected relay (the relay UE ID), it will send a resource request to this relay to request an allocation of resources for data transmission for its unicast D2D communication with UE2. In the example illustrated in FIG. 7, this will trigger the relay request a resource pool allocation to the network. However, in other examples, the relay may send the resource pool allocation request to the network of its own volition such that the messages regarding the allocation of the resource pool to the relay may occur before the terminal request resources to the relay node. Once the relay has received a resource pool allocation, it can autonomously decide on the specific resource allocation for UE1 and UE2 for their D2D communication and it can then send the relevant terminals an allocation notification message informing them of the allocation results, e.g. through sidelink control channel. On the allocated resources have been notified to the terminals, UE1 can start the unicast data transmission to UE2, through the relay and using the allocated resources selected from the resource pool, and vice versa, as appropriate.

It is noteworthy that, as explained in respect of FIG. 6, the teachings presented in respect of this example apply equally to any other suitable D2D communication to be assisted, e.g. a unicast, groupcast or broadcast communication and a unidirectional or bidirectional communication.

Also, if the relay node determines that the resource pool is no longer required and/or that a smaller resource pool may be sufficient, it can notify the network that the resource pool is released or that a smaller resource pool may be allocated, respectively. In the latter case, the network can respond with a new or updated resource pool allocation and the same principles discussed above can apply with the relay node allocating resources (or re-allocating resources if appropriate) to D2D terminals for assisting with their D2D communications using relaying.

Accordingly the relay node may semi-autonomously allocate the resources for the relaying. While the relay will select which resources to allocate to assist an existing D2D communication, the resources are selected from a resource pool which—in this example—is allocated to the relay by the network. Accordingly, the network can have some oversight over which resources are used in which areas while it will not have to use its own wireless and/or computing resources to handle the actual allocation of resources for assisting D2D communications by relaying. Accordingly, the burden on the network can be reduced by having the relay node allocating the relaying resources.

In accordance with a third example of the present disclosure, there is provided an arrangement where the relaying resources are allocated without any specific network control. In this case, the relay node can operate using a pre-configured resource pool. The pre-determined resource pool configuration could be broadcast to the network or pre-configured in relay. As in the second example, the relay UE will be responsible for allocating the resources to UEs when the UE-to-UE relaying is being configured.

Figure 8:
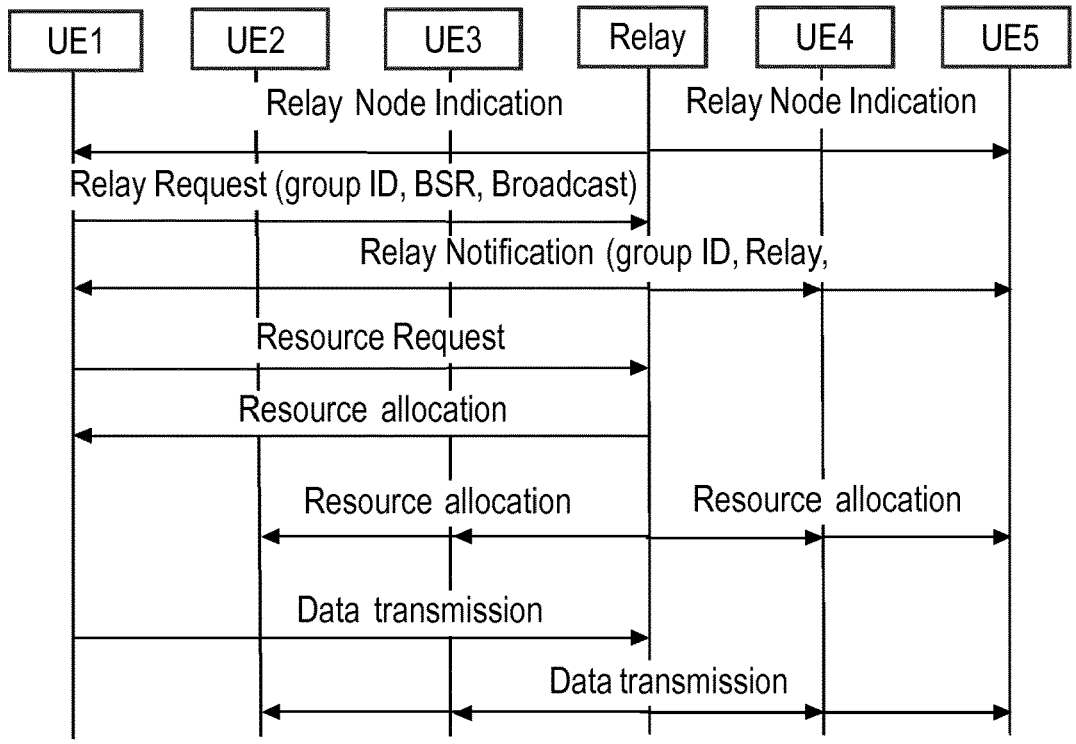
FIG. 8 illustrates a further example of a call flow for a D2D relaying resources allocation.

FIG. 8 illustrates another example of a call flow for a D2D relaying resources allocation. Although the third example is also applicable to unicast communications, as the previous examples have been illustrated for relaying unicast communications, this third example will be illustrated in the context of a broadcast and of a groupcast communication. As the skilled person will understand, the teachings discussed in respect of broadcast and groupcast communications in the context of this third example are also applicable to the first and second examples presented above and the techniques discussed above in respect of unicast communications are equally applicable to the present example. In this example UE1 is in D2D broadcast communication with its neighbours. UE2, UE3, UE4 and UE5. However, the links between UE1 and its neighbours may be suffering from a low quality, for example because UE1 may not be located in an ideal "centre" of the broadcast group. In this example, a self-triggered relay UE nearby sends a relay node indication message to indicate its role as a relay once it has identified that it can assist with the communication. The rule used for the self-trigger ay for example that it has a good or good-enough average link quality with all the relevant UE1's neighbouring UEs. It can be decided that this terminal can assist by relaying messages for the D2D communication and can thus work as an intermediate node to relay the message from UE 1 to the others. Such a relay may sometimes be referred to as a UE-to-UE or terminal-to-terminal "broadcast" relay. Again, it is noteworthy that the procedure to select the relay and notify the relay selection shown in FIG. 8 is purely illustrative and that other methods or techniques may be used in this third example.

In this third example, the relay already has is a pre-configured resource pool for operating as a relay node and to schedule the resources for the UEs it is assisting. In this example the sender UE1 sends a relay request and the relay UE then sends a relay notification to UE1 as well as to all the other UEs. In this example, once UE1 receives the Relay Notification that indicates the relay UE ID, it sends a resource request to the relay to ask the resource allocation for its data transmission. The relay UE can then decide on the specific resources for UE1 to transmit the data from UE1 to relay itself, as well as the specific resources for the other UEs to receive the data from relay (and originally from UE1). The relay then sends a notification for the resource allocation results to UE1, and to all the other UEs for the broadcast communication. Using the received allocated resources notification, UE1 can start a unicast data transmission to the relay, which will in turn broadcast the corresponding received data to all the other UEs.

Figure 9:
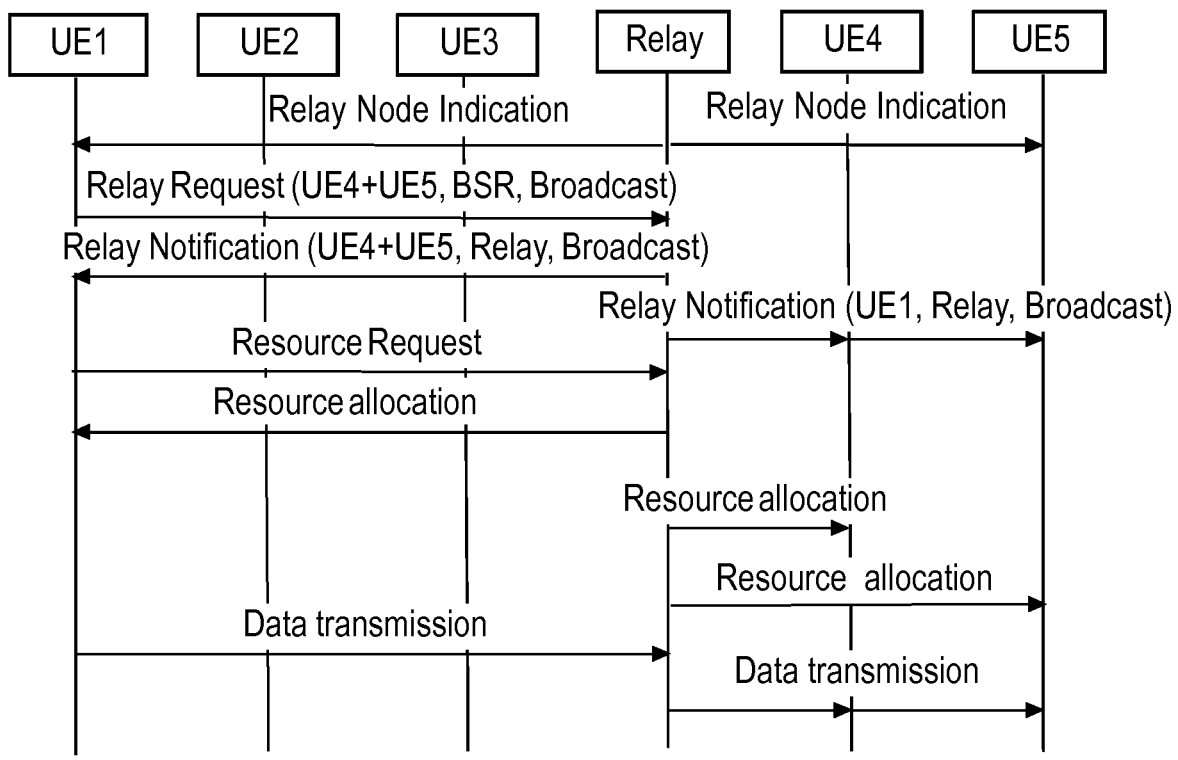
FIG. 9 illustrates yet another example of a call flow for a D2D relaying resources allocation.

For the sake of completeness, an example with a relaying assistance with group cast communications is also hereby illustrated with respect to FIG. 9 and in the context of the third example (although it is also applicable to the other examples). FIG. 9 illustrates a further example of a call flow for a D2D relaying resources allocation. In this example, as in the example of FIG. 8, UE1 is in D2D broadcast communication with UE2, UE3, UE4 and UE5. In this case, while UE2 and UE3 receive the signals from UE1 with a relatively good quality, UE4 and UE5 have poor quality links with UE1—for example because they are relatively far from UE1 or for any other reason. In this example, a self-triggered relay UE nearby sends a relay node indication message to indicate its role as a relay, where the relay UE has good link quality with UE1 as well as with UE4 and UE5. Then this relay UE can operate as an intermediate node to relay the message from UE1 to UE4 and UE5, but as UE2 and UE3 have relatively good quality links with UE1, the relay does not operate as a relay for these two terminals. Such a relay node can sometimes be referred to as a UE-to-UE or terminal-to-terminal groupcast relay as it relays messages for a group of one or more terminals where the messages are broadcast messages to the group of terminals and additional terminals such that the group is made of some but not all of the intended broadcast recipients for the D2D broadcast messages.

As this figure also illustrates another situation with the third example, a pre-configured resource pool is also used by the relay node to schedule and allocate the resources for its UEs. In this example, it is assumed that the sender UE1 is the first one to detect the bad quality links with UE4 and UE5, and, as a result, sends the relay request. In other examples, it could be UE4 and UE5 sending the relay request, or any other relevant mobile node (e.g. terminal, relay node, base station, etc.). Once a relay has been selected and UE1 receives a Relay Notification indicating the relay UE ID for the selected relay, it can send a resource request to relay to ask for resources to be allocated for its transmissions. Once this request has been received, the relay can decide the specific resources for UE1 to transmit the data from UE1 to relay, as well as the specific resources for UE4 and UE5 to receive the data from relay which was originally sent by UE1. In some cases, the resource request may be sent by UE4 and/or UE5 instead of UE1. Also, if the mobile telecommunication does not provide the means to transmit a relayed message to UE4 and UE5 at the same time (e.g. using a multicast arrangement, creating a group for broadcasting the message to the group containing UE4 and UE5), the relay may then have to allocate resources for sending a first message to UE4 and separate resources for sending another message to UE5 when relaying a single original message from UE1 to both UE4 and UE5. This may for example depending on the message addressing techniques used to address the different UEs and on whether these techniques enable the relay to relay one message from UE1 as a single message or as multiple messages to multiple UEs. Once the resource(s) have been selected from the resource pool, the relay can send a notification regarding the resource allocation results to UE1, UE4 and UE5. With the received resource allocation notification, UE1 can send a unicast data transmission to relay (or the relay may receive the communication from the original broadcast message broadcasted to the remaining UEs) and the relay can transmit the corresponding data to UE4 and UE5 by groupcast, using the allocated resources.

Accordingly, by having the resources entirely managed by the relay node, the burden on the network can be made smaller by reducing the amount of computing resources and signalling to be exchanged by the base station. However, on the other hand, such an arrangement may result in a less optimal distribution of resources within the network as the overall allocation of resources is not as supervised by the network as in the second example, let alone the first example. Accordingly, depending on the specific needs at a point in time, it may be decided that one of the first, second or third examples may be preferable in the situation at hand.

Figure 10:
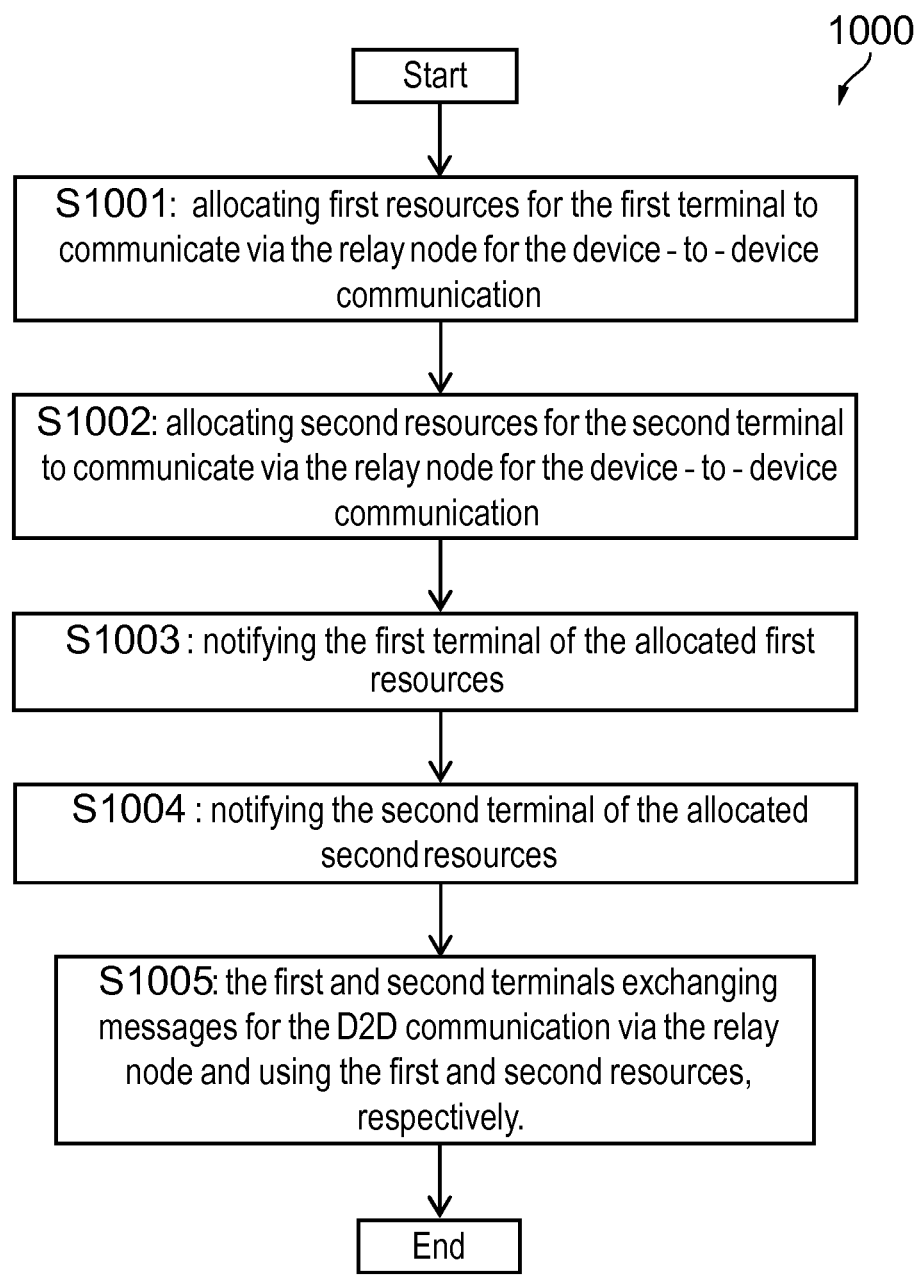
FIG. 10 illustrates an example method of allocating D2D relaying resources.

Examples methods of allocating resources in a mobile telecommunications network will now be discussed with respect to FIGS. 10-12. FIG. 10 illustrates an example method of allocating D2D relaying resources. The method 1000 starts and at S1001 first resources are allocated for the first terminal to communicate via the relay node for the device-to-device communication while at S1002 second resources are allocated for the second terminal to communicate via the relay node for the device-to-device communication. Then at S1003 and S1004 the first and second terminal, respectively, are notified of the allocated first and second resources, respectively. Then at S1005 the first and second terminals can exchange messages for the D2D communication via the relay node and using the first and second resources, respectively.

Figure 11:
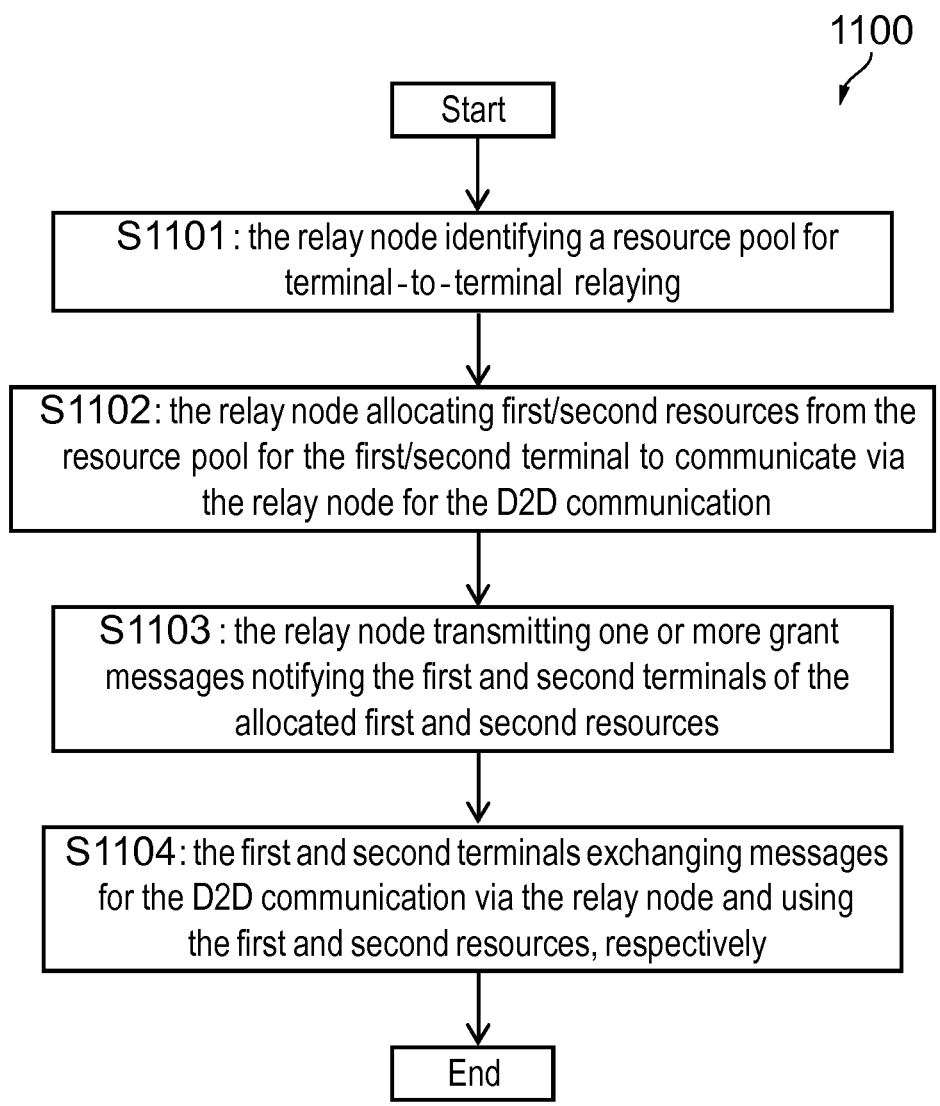
FIG. 11 illustrates another example method of allocating D2D relaying resources.

FIG. 11 illustrates another example method of allocating D2D relaying resources. The method 1100 starts and at S1101 the relay node identifies a resource pool for terminal-to-terminal relaying. In some example this may involve identifying a pre-determined resource pool while in other cases this may involve identifying an already allocated resource pool or requesting a resource pool allocation to the network. Then, at S1102 the relay node allocates first/second resources from the resource pool for the first/second terminal—respectively—to communicate via the relay node for the D2D communication. For example, the resources can be for a unicast transmission to the terminal or can be for a broadcast transmission that will reach this terminal. Then at S1103 the relay node can transmit one or more grant messages notifying the first and second terminals of the allocated first and second resources. In one example it can send one grant message (resource allocation notification) to each terminal and in another example it can broadcast the resource allocation notification to at least the first and second terminals. Then the first and second terminals can exchange messages for the D2D communication via the relay node and using the first and second resources, respectively.

Figure 12:
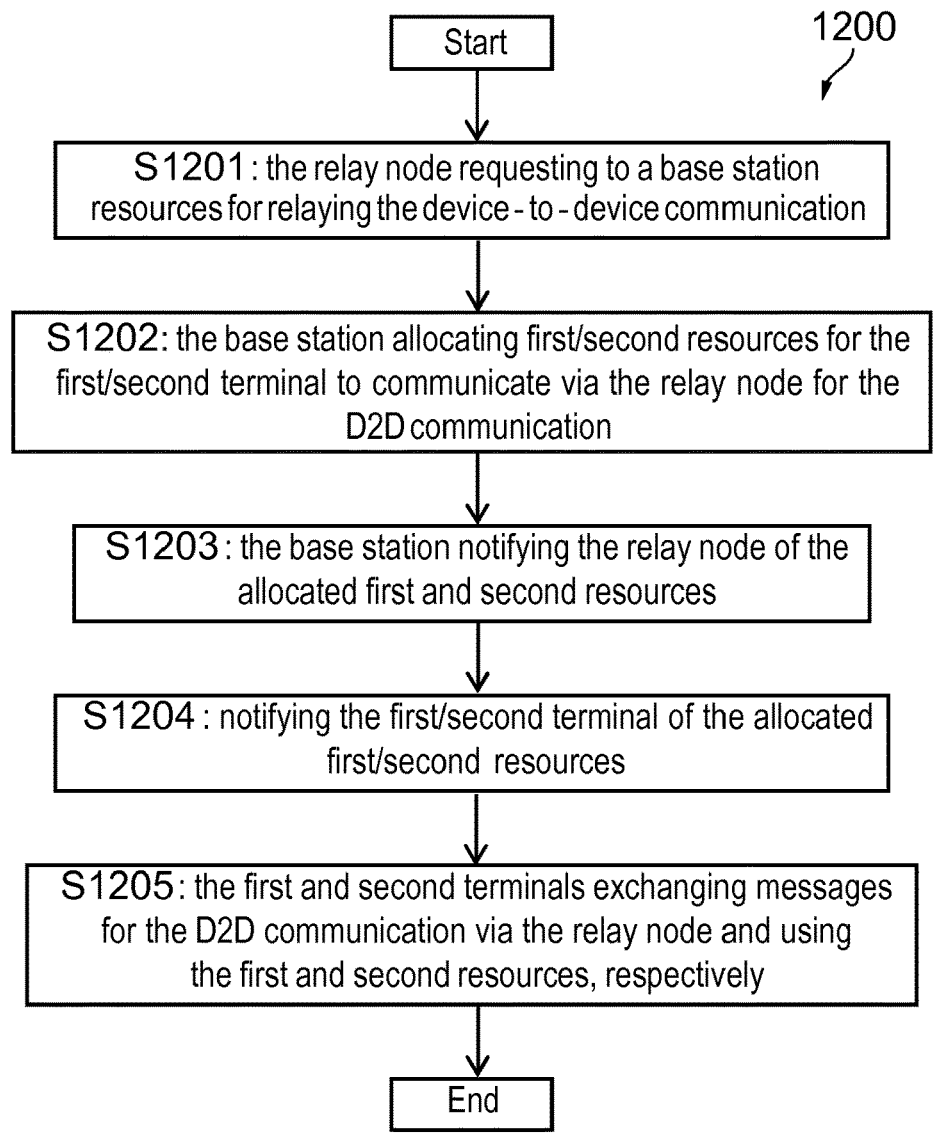
FIG. 12 illustrates a further example method of allocating D2D relaying resources.

FIG. 12 illustrates a further example method of allocating D2D relaying resources. The method 1200 starts and at S1201 with the relay node requesting to a base station resources for relaying the device-to-device communication. Accordingly, the base station allocates first/second resources for the first/second terminal—respectively—to communicate via the relay node for the D2D communication (S1202). Then at S1203: the base station notifies the relay node of the allocated first and second resources. At S1204, the first/second terminals are notified of the allocated first/second resources. In some example, the base station can notify them of the allocated resources while in other example, the relay node may notify them. As the relay is expected be within range of the two terminals in all cases (as it has been selected as a relay) while the base station may not always have the terminals within its range, it may be decided that the relay node will always send this notification with a view to avoiding making the arrangement more complex. Then at S1205, the first and second terminals exchange messages for the D2D communication via the relay node and using the first and second resources, respectively.

Figure 13:
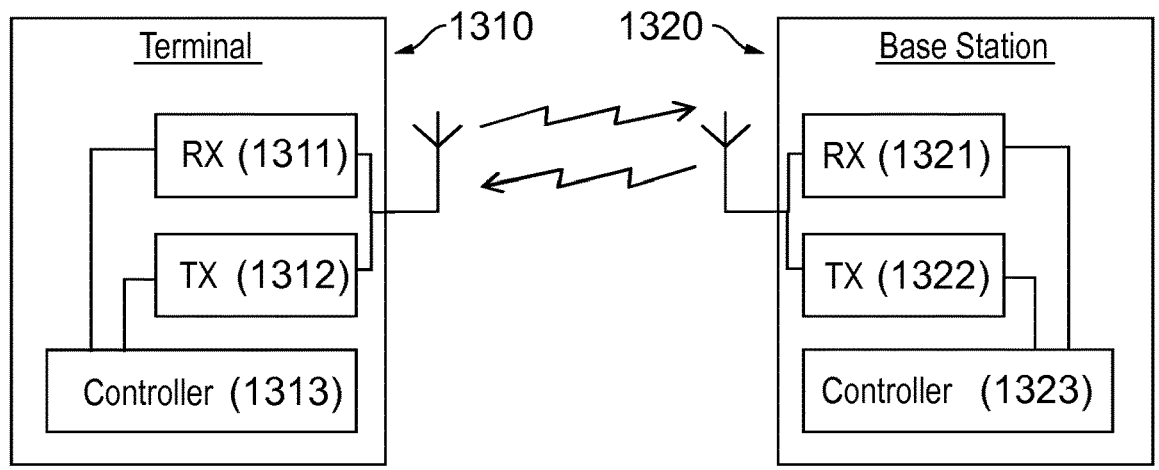
FIG. 13 illustrates an example terminal and an example base station in a telecommunications system.

FIG. 13 illustrates an example terminal (1310) and an example base station (1320) configured to communicate with each other and which may implement one or more techniques as discussed herein. The terminal 1310 comprises a receiver 1311 and a transmitter 1312 connected to an antenna for communicating via a wireless interface. The terminal also comprises a controller 1313 for controlling at least the receiver and transmitter of the terminal 1310. In some example, the terminal may be configured such that the controller, receiver and transmitter may be configured to operate together to operate as a D2D relay node to assist communication from other terminals. Likewise, the base station 1320 comprises a receiver 1321 and a transmitter 1322 connected to an antenna for communicating via a wireless interface. The base station 1320 also comprises a controller 1323 for controlling at least the receiver and transmitter of the base station 1320. The base station and terminal can communicate over the air, via the wireless interface by transmitting uplink signals from the terminal to the base station and downlink signals from the base station to the terminal. D2D Terminals can also communicate with each other directly using sidelink signals. A relay node in accordance with the present disclosure may also have the same structure as the terminal and/or base station.

While FIG. 13 shows a schematic illustration of a terminal and of a base station, it will be appreciated that while in examples of the present disclosure, each terminal includes a transmitter, receiver and controller and each base station includes a transmitter, receiver and controller so as to allow communication between the terminals and/or base stations, the terminal and base station may be implemented using any appropriate technique. For example, the controller may comprise one or more processor units which are suitably configured/programmed to provide the desired functionality described herein using conventional programming/configuration techniques for equipment in wireless telecommunications systems. For each terminal, the transmitter, receiver and controller are schematically shown in FIG. 13 as separate elements for ease of representation. However, it will be appreciated that for each terminal the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminals will in general comprise various other elements associated with their operating functionality in accordance with established wireless telecommunications techniques (e.g. a power source, possibly a user interface, and so forth).

It is noteworthy that the teachings of the present invention when presented in respect of a first terminal and a second terminal include cases where the communications are broadcasted and where the second terminal is one of the recipient of the broadcasted messages. Also, generally in the examples, the arrangements discussed involve first a relay notification identifying the relay node and then resource request followed by a resource allocation response, e.g. by the relay node. However, in other cases less signalling may be involved and the relay notification may also include the notification of the resource allocation. For example, once the relay has been selected, it can select the resources to be allocated to the first and second terminals and at the same time as notifying the terminals of its relay role, it can inform/notify them of the resources that have been allocated for this node to relay the relevant messages from the assisted D2D communication.

Also, generally the allocation of resources has been discussed herein but the same principles apply to the release of resources. Generally any element that can allocate resources can also release them if deemed appropriate (e.g. following a determination) or may be informed that the resources are no longer needed and have been released or can be released. For example, in the second and third example, the relay node can release resources that have been allocated for assisting a D2D communication, while in the second example it may also release or request the release of the resource pool that had been allocated to it. In the first example, the base station/the network can release the resources allocated for the relay node to assist with the D2D communication.

Therefore, in accordance with the present disclosure, there is provided an arrangement in which the D2D communications can be assisted using terminal-to-terminal relaying between a first D2D terminal and one or more other D2D terminals and where resources can be appropriately allocated for the terminal-to-terminal relaying. It is noteworthy that while existing LTE Rel'12 and Rel'13 standard outlines some relaying solutions, these have been designed to address public safety communications (ProSe) which are mainly UE-to-Network relay oriented, such that they can be unhelpful when considering the different situation of terminal-to-terminal relaying, in particular for both or either unicast or broadcast D2D communications.

It is also noteworthy that, in accordance with the present disclosure and as previously discussed, the allocation of resources for the relaying may be based on the type of D2D communication, for example one of unicast, multicast or broadcast or, for current D2D standards proposed by the 3GPP consortium, one of unicast or broadcast. In these examples, this could for example affect the amount of resources to be allocated, in particular if a broadcast communication leads to a groupcast relaying.

In the examples above where information has to be sent from a terminal to another mobile node (e.g. a relay node or a base station), the terminal may not always be already in a connected state and might have to change to a connected mode to send the information, and the terminal may then change back to a non-connected state. For example, in a case where a neighbouring terminal (regardless of it being a request terminal or not) wishes to send a measurement report to a base station, a terminal or a relay node, in a 3GPP environment using an RRC protocol, the neighbouring terminal may not be in a RRC_CONNECTED state. In this case, the terminal may transition to a RRC_CONNECTED state, for example following the network (e.g. the base station) sending RRC connection establishment signalling, so that the terminal can send the measurement report. The terminal may then transition back to the RRC_IDLE state, if appropriate.

Additionally, the method steps discussed herein may be carried out in any suitable order. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously or in the same order. For example, in the method of FIG. 10, S1001-S1002 may be carried out in any suitable order, such as one after the other (S1001-S1002 or S1002-S1001) or at least partially in parallel. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example transmitting a message may involve using several resource elements in an LTE environment such that several signals at a lower layer correspond to a single message at a higher layer. Also, transmissions from one terminal to another may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more or a mobile terminal (e.g. a D2D terminal), a relay node (e.g. a terminal-to-terminal relay node), a base station or any other mobile node may be configured accordingly if appropriate, so long as it is technically feasible and not explicitly excluded.

Whenever the expressions "greater than" or "smaller than" or equivalent are used herein, it is intended that they discloses both alternatives "and equal to" and "and not equal to" unless one alternative is expressly excluded.

It is noteworthy that even though the present disclosure has been discussed in the context of LTE and/or D2D, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard (e.g. the 5G standards).

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered clauses:

Clause 1. A method of allocating resources in a mobile telecommunications system, the resources being for a relay node to operate as a terminal-to-terminal relay for a device-to-device communication between a first terminal and a second terminal, the method comprising:
allocating first resources for the first terminal to communicate via the relay node for the device-to-device communication;
allocating second resources for the second terminal to communicate via the relay node for the device-to-device communication;
notifying the first terminal of the allocated first resources;
notifying the second terminal of the allocated second resources; and
the first and second terminals exchanging messages for the device-to-device communication via the relay node and using the first and second resources, respectively.

Clause 2. A method of operating a terminal in a mobile telecommunications system and for using a relay node as a terminal-to-terminal relay for a device-to-device communication between the terminal and a further terminal, the method comprising the terminal:
receiving one or more grant messages notifying the terminal of allocated resources for the relay node to relay the device-to-device communication; and
the terminal exchanging messages with the further terminal for the device-to-device communication, via the relay node and using the allocated resources.

Clause 3. The method of clause 2 further comprising the terminal transmitting a resource allocation request to the relay node for the relay node to allocate resources for relaying the device-to-device communication with the further terminal.

Clause 4. A terminal for use in a mobile telecommunications system and for using a relay node as a terminal-to-terminal relay for a device-to-device communication between the terminal and a further terminal, the terminal comprising a transceiver and a controller, wherein the controller is configured to:
receive, via the transceiver, one or more grant messages notifying the terminal of allocated resources for the relay node to relay the device-to-device communication; and
exchange, via the transceiver, messages with the further terminal for the device-to-device communication, via the relay node and using the allocated resources.

Clause 5. Circuitry for a terminal for use in a mobile telecommunications system and for using a relay node as a terminal-to-terminal relay for a device-to-device communication between the terminal and a further terminal, wherein the circuitry comprises a controller element and a transceiver element configured to operate together to:
receive one or more grant messages notifying the terminal of allocated resources for the relay node to relay the device-to-device communication; and
exchange messages with the further terminal for the device-to-device communication, via the relay node and using the allocated resources.

Clause 6. A method of allocating resources in a mobile telecommunications system, the resources being for a relay node to operate as a terminal-to-terminal relay for a device-to-device communication between a first terminal and a second terminal, the method comprising:
the relay node identifying a resource pool for terminal-to-terminal relaying;
the relay node allocating first resources from the resource pool for the first terminal to communicate via the relay node for the device-to-device communication;
the relay node allocating second resources from the resource pool for the second terminal to communicate via the relay node for the device-to-device communication;
the relay node transmitting one or more grant messages notifying the first and second terminals of the allocated first and second resources; and
the first and second terminals exchanging messages for the device-to-device communication via the relay node and using the first and second resources, respectively.

Clause 7. The method of clause 6 wherein the relay node identifying a resource pool comprises:
the relay node requesting a resource pool allocation from a base station; and
the base station allocating the resource pool to the relay node.

Clause 8. The method of clause 7 wherein the relay node requesting the resource pool allocation is responsive to receiving a terminal-to-terminal relaying resource allocation request from the first terminal.

Clause 9. The method of clause 7 or 8 further comprising the relay node releasing the allocated resource pool by transmitting a resource pool release message to the base station.

Clause 10. The method of clause 6 wherein the relay node identifying a resource pool comprises the relay node identifying a pre-allocated resource pool.

Clause 11. The method of any of clauses 6 to 10, wherein the device-to-device communication is one of a unicast, a groupcast or a broadcast communication.

Clause 12. The method of any of clauses 6 to 11, wherein the relay node allocating first resources is at least one of: upon request from the first terminal; upon request from the second terminal, upon receiving instructions from a base station and upon determination by the relay node.

Clause 13. The method of any of clauses 6 to 12, wherein the relay node allocating second resources is at least one of: upon request from the first terminal; upon request from the second terminal, upon receiving instructions from a base station and upon determination by the relay node.

Clause 14. The method of any of clauses 6 to 13, wherein at least one of the relay node allocating first resources and the relay node allocating second resources is based on one or more of:
a resource allocation request from one of the first terminal and the second terminal;
a determination by the relay node that it will operate as a terminal-to-terminal relay for the device-to-device communication; and
a notification from a base station and/or from one of the first and second terminals that the relay node has been selected for relaying the device-to-device communication.

Clause 15. The method of any of clauses 6 to 14, wherein the relay node transmitting one or more grant messages comprises at least one of:
broadcasting the first resources to a group of terminal comprising the first terminal; and broadcasting the second resources to a group of terminal comprising the second terminal.

Clause 16. The method of any of clauses 6 to 15, wherein first resources are for one or both of: resources for the first terminal to transmit signals to the relay node and resources for the relay node to transmit signals to the first terminal.

Clause 17. The method of any of clauses 6 to 16, wherein second resources are for one or both of: resources for the second terminal to transmit signals to the relay node and resources for the relay node to transmit signals to the second terminal.

Clause 18. The method of any of clauses 6 to 17, comprising the relay node releasing the first and second sets of resources upon at least one of:
determination that the relay node will no longer operate as a terminal-to-terminal relay for the device-to-device communication; and
termination of the device-to-device communication.

Clause 19. A method of operating a relay node for allocating resources in a mobile telecommunications system, the resources being for a relay node to operate as a terminal-to-terminal relay for a device-to-device communication between a first terminal and a second terminal, the method comprising the relay node:
identifying a resource pool for terminal-to-terminal relaying;
allocating first resources from the resource pool for the first terminal to communicate via the relay node for the device-to-device communication;
allocating second resources from the resource pool for the second terminal to communicate via the relay node for the device-to-device communication; and
transmitting one or more grant messages notifying the first and second terminals of the allocated first and second resources.

Clause 20. The method of clause 19 further comprising the relay node relaying, using the first and second resources, messages for the device-to-device communication exchanged by the first and second terminals.

Clause 21. A relay node for allocating resources in a mobile telecommunications system, the resources being for a relay node to operate as a terminal-to-terminal relay for a device-to-device communication between a first terminal and a second terminal, the relay node comprising a transceiver and a controller, the controller being configured to:
identify a resource pool for terminal-to-terminal relaying;
allocate first resources from the resource pool for the first terminal to communicate via the relay node for the device-to-device communication;
allocate second resources from the resource pool for the second terminal to communicate via the relay node for the device-to-device communication; and
transmit, via the transceiver, one or more grant messages notifying the first and second terminals of the allocated first and second resources.

Clause 22. Circuitry for a relay node for allocating resources in a mobile telecommunications system, the resources being for a relay node to operate as a terminal-to-terminal relay for a device-to-device communication between a first terminal and a second terminal, wherein the circuitry comprises a controller element and a transceiver element configured to operate together to:
identify a resource pool for terminal-to-terminal relaying;
allocate first resources from the resource pool for the first terminal to communicate via the relay node for the device-to-device communication;
allocate second resources from the resource pool for the second terminal to communicate via the relay node for the device-to-device communication; and
transmit one or more grant messages notifying the first and second terminals of the allocated first and second resources.

Clause 23. A method of operating a base station in a mobile telecommunications system and for using a relay node as a terminal-to-terminal relay for a device-to-device communication between a first terminal and a second terminal, the method comprising the base station:
receiving, from the relay node, a resource pool allocation request;
identifying a resource pool for the relay node to allocate resources for terminal-to-terminal relaying;
notifying the relay node that the identified resource pool has been allocated to the relay node to allocate resources for terminal-to-terminal relaying.

Clause 24. A base station for use in a mobile telecommunications system and for using a relay node as a terminal-to-terminal relay for a device-to-device communication between a first terminal and a second terminal, the base station comprising a transceiver and a controller, the controller being configured to:
receive, from the relay node and via the transceiver, a resource pool allocation request;
identify a resource pool for the relay node to allocate resources for terminal-to-terminal relaying;
notify, via the transceiver, the relay node that the identified resource pool has been allocated to the relay node to allocate resources for terminal-to-terminal relaying.

Clause 25. Circuitry for a base station for use in a mobile telecommunications system and for using a relay node as a terminal-to-terminal relay for a device-to-device communication between a first terminal and a second terminal, wherein the circuitry comprises a controller element and a transceiver element configured to operate together to:
receive, from the relay node, a resource pool allocation request;
identify a resource pool for the relay node to allocate resources for terminal-to-terminal relaying;
notify the relay node that the identified resource pool has been allocated to the relay node to allocate resources for terminal-to-terminal relaying.

Clause 26. A method of allocating resources in a mobile telecommunications system, the resources being for a relay node to operate as a terminal-to-terminal relay for a device-to-device communication between a first terminal and a second terminal, the method comprising:
the relay node requesting, to a base station, resources for relaying the device-to-device communication;
the base station allocating first resources for the first terminal to communicate via the relay node for the device-to-device communication;
the base station allocating second resources for the second terminal to communicate via the relay node for the device-to-device communication;
the base station notifying the relay node of the allocated first and second resources;
notifying the first terminal of the allocated first resources;
notifying the second terminal of the allocated second resources; and
the first and second terminals exchanging messages for the device-to-device communication via the relay node and using the allocated first and second resources, respectively.

Clause 27. The method of clause 26 wherein at least one of the notifying the first terminal and notifying the second terminal is by the relay node.

Clause 28. The method of clause 26 or 27 wherein at least one of the notifying the first terminal and notifying the second terminal is by the base station.

Clause 29. A method of operating a relay node for allocating resources in a mobile telecommunications system, the resources being for a relay node to operate as a terminal-to-terminal relay for a device-to-device communication between a first terminal and a second terminal, the method comprising the relay node:
requesting, to a base station, resources for relaying the device-to-device communication; and
receiving, from the base station, a notification of allocated first resources and allocated second resources, the allocated first resources being allocated for the first terminal to communicate via the relay node for the device-to-device communication and the allocated second resources being allocated for the second terminal to communicate via the relay node for the device-to-device communication.

Clause 30. The method of clause 29 further comprising the relay node receiving a resource allocation request from one of the first and second terminals for relaying the device-to-device communication.

Clause 31. The method of clause 29 or 30 wherein the relay node notifies the first terminal of the allocated first resources and/or notifies the second terminal of the allocated second resources.

Clause 32. The method of one of clauses 29 to 31 further comprising the relay node relaying, using the allocated first and second resources, messages for the device-to-device communication exchanged by the first and second terminals.

Clause 33. A relay node for allocating resources in a mobile telecommunications system, the resources being for a relay node to operate as a terminal-to-terminal relay for a device-to-device communication between a first terminal and a second terminal, the relay node comprising a transceiver and a controller, the controller being configured to:
request, to a base station and via the transceiver, resources for relaying the device-to-device communication; and
receive, via the transceiver and from the base station, a notification of allocated first resources and allocated second resources, the allocated first resources being allocated for the first terminal to communicate via the relay node for the device-to-device communication and the allocated second resources being allocated for the second terminal to communicate via the relay node for the device-to-device communication.

Clause 34. Circuitry for a relay node for allocating resources in a mobile telecommunications system, the resources being for a relay node to operate as a terminal-to-terminal relay for a device-to-device communication between a first terminal and a second terminal, wherein the circuitry comprises a controller element and a transceiver element configured to operate together to:
request, to a base station, resources for relaying the device-to-device communication; and
receive, from the base station, a notification of allocated first resources and allocated second resources, the allocated first resources being allocated for the first terminal to communicate via the relay node for the device-to-device communication and the allocated second resources being allocated for the second terminal to communicate via the relay node for the device-to-device communication.

Clause 35. A method of operating a base station in a mobile telecommunications system and for using a relay node as a terminal-to-terminal relay for a device-to-device communication between a first terminal and a second terminal, the method comprising the base station:
receiving, from a relay node, a request for resources for relaying the device-to-device communication;
allocating first resources for the first terminal to communicate via the relay node for the device-to-device communication;
allocating second resources for the second terminal to communicate via the relay node for the device-to-device communication; and
notifying the relay node of the allocated first and second resources.

Clause 36. The method of clause 35 further comprising the base station:
notifying the first terminal of the allocated first resources; and
notifying the second terminal of the allocated second resources.

Clause 37. A base station for use in a mobile telecommunications system and for using a relay node as a terminal-to-terminal relay for a device-to-device communication between a first terminal and a second terminal, the base station comprising a transceiver and a controller, the controller being configured to:
receive, from a relay node and via the transceiver, a request for resources for relaying the device-to-device communication;
allocate first resources for the first terminal to communicate via the relay node for the device-to-device communication;
allocate second resources for the second terminal to communicate via the relay node for the device-to-device communication; and
notify, via the transceiver, the relay node of the allocated first and second resources.

Clause 38. Circuitry for a base station for use in a mobile telecommunications system and for using a relay node as a terminal-to-terminal relay for a device-to-device communication between a first terminal and a second terminal, wherein the circuitry comprises a controller element and a transceiver element configured to operate together to:
receive, from a relay node requesting a request for resources for relaying the device-to-device communication;
allocate first resources for the first terminal to communicate via the relay node for the device-to-device communication;
allocate second resources for the second terminal to communicate via the relay node for the device-to-device communication; and
notify the relay node of the allocated first and second resources.

Clause 39. Computer software which, when executed by a computer, causes the computer to perform the method of any one of clauses 1, 2-3, 6-18, 19-20, 23, 26-28, 29-32, 35-36.

Clause 40. A storage medium which stores computer software according to clause 39.

Clause 41. A method of allocating resources in a mobile telecommunications system, a method of operating a terminal, a terminal, circuitry for a terminal, a method of allocating resources, a method of operating a relay node, a relay node for allocating resources, circuitry for a relay node for allocating resources, a method of operating a base station, a base station, a method of allocating resources, computer software and/or a storage medium substantially as hereinbefore described with reference to the accompanying drawings Clause 42. Any preceding clause wherein the mobile terminal(s) and the relay node (and the base station if appropriate) are operable to communicate via the wireless interface using at least one of: a 3GPP communication protocol, an LTE communication protocol, a 4G communication protocol and a 5G communication protocol.

REFERENCES

[1] Holma H. and Toskala A., "LTE for UMTS OFDMA and SC-FDMA based radio access", John Wiley and Sons, 2009

The invention claimed is:

1. A method of allocating resources in a mobile telecommunications system, the resources being for a relay node to operate as a terminal-to-terminal relay for device-to-device (D2D) communication between a first terminal and a second terminal, the method comprising:
   in a case that the first terminal determines that a signal quality for the D2D communication between the first terminal and the second terminal is below a threshold, receiving, by the relay node, a relay request directed to the relay node and sent by the first terminal without receiving another relay request from the second terminal;
   allocating, in response to receiving the relay request without receiving another relay request from the second terminal, first resources of the resources for the first terminal to communicate via the relay node for the D2D communication with the second terminal;
   allocating, in response to receiving the relay request without receiving the another relay request from the second terminal, second resources of the resources for the second terminal to communicate via the relay node for the D2D communication with the first terminal;
   notifying, by the relay node, the first terminal of a first relay notification, the first relay notification indicating an identification of the relay node and the allocated first resources;
   notifying, by the relay node, the second terminal of a second relay notification, the second relay notification indicating the identification of the relay node and the allocated second resources; and
   relaying messages, via the relay node and over the first and second resources, between the first and second terminals for the D2D communication, wherein
   the first terminal performs other D2D communication with a third terminal without relaying messages via the relay node in a case that the a signal quality for the other D2D communication between the first terminal and the third terminal is at or above the threshold.

2. The method of claim 1, wherein the D2D communication is one of a unicast, a groupcast or a broadcast communication.

3. The method of claim 1, wherein the allocating the first resources is performed according to at least one of:
   upon request from the first terminal;
   upon request from the second terminal;
   upon receiving instructions from a base station; and
   upon determination by the relay node.

4. A terminal for use in a mobile telecommunications system and for using a relay node as a terminal-to-terminal relay for device-to-device (D2D) communication between the terminal and a second terminal, the terminal comprising:
   a transceiver; and
   processing circuitry configured to
      determine that a quality for the D2D communication with the second terminal is below a threshold, and
      control, after determining that signal quality for the D2D communication with the second terminal is below the threshold, the transceiver to transmit a relay request to the relay node, wherein
   the second terminal does not transmit another relay request to the relay node,
   in response to transmitting the relay request, the transceiver receives from the relay node one or more grant messages, the one or more grant messages notifying the terminal of an identification of the relay node and of resources allocated for the relay node to relay the D2D communication with the second terminal, and
   the processing circuitry is further configured to
      control the transceiver to exchange messages with the second terminal via the relay node and using the allocated resources for the D2D communication, and
      perform D2D communication with a third terminal without relaying messages via the relay node in a case that the a signal quality for the D2D communication between the first terminal and the third terminal is at or above the threshold.

5. The terminal of claim 4, wherein the D2D communication is one of a unicast, a groupcast or a broadcast communication.

6. The terminal of claim 4, wherein the one or more grant messages include:
   first grant messages broadcast to a first group of terminals, the first grant messages indicating first resources designated for a first group of terminals; and
   second grant messages broadcast to a second group of terminals, the second grant messages indicating second resources designated for a second group of terminals.

7. The terminal of claim 4, wherein the resources allocated for the relay node include one or both of:
   first resources for the terminal to transmit signals to the relay node; and
   second resources for the relay node to transmit signals to the terminal.

8. A method of allocating resources in a mobile telecommunications system, the resources being for a relay node to operate as a terminal-to-terminal relay for device-to-device (D2D) communication between a first terminal and a second terminal, the method comprising:
   in a case that the first terminal determines that a signal quality for the D2D communication between the first terminal and the second terminal is below a threshold, receiving, by the relay node, a relay request directed to the relay node and sent by the first terminal without receiving another relay request from the second terminal;
   identifying, by the relay node, a resource pool for terminal-to-terminal relaying;
   allocating, in response to receiving the relay request without receiving another relay request from the second terminal, first resources from the resource pool for the first terminal to communicate via the relay node for the D2D communication with the second terminal;
   allocating, in response to receiving the relay request without receiving the another relay request from the second terminal, second resources from the resource pool for the second terminal to communicate via the relay node for the D2D communication with the first terminal;
   transmitting, by the relay node, one or more grant messages to the first and second terminals, the one or more grant messages indicating an identification of the relay node and the allocated first and second resources; and relaying messages, via the relay node and over the first and second resources, between the first and second terminals for the D2D device communication, wherein the first terminal performs other D2D communication with a third terminal without relaying messages via the relay node in a case that the a signal quality for the other D2D communication between the first terminal and the third terminal is at or above the threshold.

9. The method of claim 8, wherein the identifying the resource pool comprises:
    requesting, by the relay node, a resource pool allocation from a base station; and
    receiving, by the relay node, an allocation of the resource pool from the base station.

10. The method of claim 9, wherein the requesting the resource pool allocation is responsive to receiving the relay request from the first terminal.

11. The method of claim 9, further comprising:
    releasing, by the relay node, the allocated resource pool by transmitting a resource pool release message to the base station.

12. The method of claim 8, wherein the identifying the resource pool comprises the relay node identifying a pre-allocated resource pool.

13. The method of claim 8, wherein the D2D communication is one of a unicast, a groupcast or a broadcast communication.

14. The method of claim 8, wherein the allocating the first resources is performed according to at least one of:
    upon request from the first terminal;
    upon request from the second terminal;
    upon receiving instructions from a base station; and
    upon determination by the relay node.

15. The method of claim 8, wherein the allocating the second resources is performed according to at least one of:
    upon request from the first terminal;
    upon request from the second terminal;
    upon receiving instructions from a base station; and
    upon determination by the relay node.

16. The method of claim 8, wherein at least one of the allocating the first resources and the allocating the second resources is based on one or more of:
    a resource allocation request from one of the first terminal and the second terminal;
    a determination by the relay node that it will operate as a terminal-to-terminal relay for the D2D communication; and
    a notification from a base station and/or from one of the first and second terminals that the relay node has been selected for relaying the D2D communication.

17. The method of claim 8, wherein the transmitting the one or more grant messages comprises at least one of:
    broadcasting the first resources to a first group of terminals comprising the first terminal; and
    broadcasting the second resources to a second group of terminals comprising the second terminal.

18. The method of claim 8, wherein the first resources are for one or both of resources for the first terminal to transmit signals to the relay node and resources for the relay node to transmit signals to the first terminal.

19. The method of claim 8, wherein the second resources are for one or both of resources for the second terminal to transmit signals to the relay node and resources for the relay node to transmit signals to the second terminal.

20. The method of claim 8, further comprising releasing first and second sets of resources upon at least one of:
    determination that the relay node will no longer operate as the terminal-to-terminal relay for the D2D communication between the first terminal and the second terminal; and
    termination of the D2D communication between the first terminal and the second terminal.

* * * * *